United States Patent
Taslakian et al.

(10) Patent No.: US 12,159,452 B2
(45) Date of Patent: Dec. 3, 2024

(54) AUTOMATICALLY PREDICTING TEXT IN IMAGES

(71) Applicant: SERVICENOW CANADA INC., Montréal (CA)

(72) Inventors: Perouz Taslakian, Montreal (CA); Negin Sokhandan Asl, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 0 days.

(21) Appl. No.: 17/309,255

(22) PCT Filed: Nov. 14, 2019

(86) PCT No.: PCT/CA2019/051627
§ 371 (c)(1),
(2) Date: May 12, 2021

(87) PCT Pub. No.: WO2020/097734
PCT Pub. Date: May 22, 2020

(65) Prior Publication Data
US 2022/0019834 A1  Jan. 20, 2022

Related U.S. Application Data

(60) Provisional application No. 62/767,750, filed on Nov. 15, 2018.

(51) Int. Cl.
*G06V 10/82* (2022.01)
*G06F 16/538* (2019.01)
(Continued)

(52) U.S. Cl.
CPC ............ *G06V 10/82* (2022.01); *G06F 16/538* (2019.01); *G06F 16/5846* (2019.01);
(Continued)

(58) Field of Classification Search
None
See application file for complete search history.

(56) References Cited

U.S. PATENT DOCUMENTS

| | | | |
|---|---|---|---|
| 2007/0084928 | A1 | 4/2007 | Ackley et al. |
| 2019/0197154 | A1* | 6/2019 | Cohen ..................... G06F 16/54 |
| 2020/0151503 | A1* | 5/2020 | Wang ................... G06F 18/214 |

FOREIGN PATENT DOCUMENTS

EP    1104174    5/2001

OTHER PUBLICATIONS

Hui Li et al. "Show, Attend and Read: A Simple and Strong Baseline for Irregular Text Recognition", arxiv.org, Cornell University Library, 201 Olin Library Cornell University Ithaca, NY 14853, Nov. 2, 2018 XP081045166.
(Continued)

*Primary Examiner* — Bernard Krasnic
(74) *Attorney, Agent, or Firm* — FASKEN MARTINEAU DUMOULIN LLP; Johann Gest

(57) ABSTRACT

Systems and methods for detecting and predicting text within images. An image is passed to a feature-extraction module. Each image typically contains at least one text object, and each text object contains at least one character. Based on the image, the feature-extraction module generates at least one feature map indicating text object(s) in the image. The feature map(s) is then passed to a decoder module. In son implementations, the decoder module applies a weighted mask to the feature map(s). Based on the feature map(s), the decoder module predicts a sequence of characters in the text object(s). In some embodiments, that prediction is based on previous known data. The decoder module is directed by a query that indicates at least one desired characteristic of the text object(s). An output module then refines the predicted content. At least one neural network may be used.

18 Claims, 7 Drawing Sheets

(51) Int. Cl.
 *G06F 16/583* (2019.01)
 *G06V 20/62* (2022.01)
 *G06V 30/10* (2022.01)
 *G06V 30/14* (2022.01)
 *G06V 30/148* (2022.01)
 *G06V 30/19* (2022.01)
 *G06V 30/262* (2022.01)

(52) U.S. Cl.
 CPC .......... *G06V 20/62* (2022.01); *G06V 30/1444* (2022.01); *G06V 30/153* (2022.01); *G06V 30/19173* (2022.01); *G06V 30/262* (2022.01); *G06V 30/10* (2022.01)

(56) References Cited

OTHER PUBLICATIONS

Liu Zichuan et al. "SqueezedTextL A Real-Time Scene Text Recognition by Binary Convolutional Encoder-Decoder Network", The Thirty-Second AAAI Conference on Artificial Intelligence, Apr. 27, 2018, pp. 7194-7201, XP0558662.

Mitra et al, "Information Retrieval from Documents: A Survey", Information Retrieval, Kluwer Academic Publishers, Netherlands, vol. 2000, part 2/3, Jan. 1, 2000.

* cited by examiner

| Input | Label | Prediction |
|---|---|---|
| Cineplex Cinemas<br>4340 Carl Circle<br>Grantborough,<br>81420<br>+61(4)1907800052<br>08/05/2008 21:55:37 | Cineplex Cinemas<br>4340 Carl Circle | Cineplex Cinemas<br>4340 Carl Circle |
| A Cut Beyond<br>0800 Jason Lane<br>South Markstad, 60301<br>(809)132-2194x56898<br>1992-04-01 06:56:46 | A Cut Beyond 0800<br>Jason Lane | A Cut Beyond 0800<br>Jason Lane |

| Input | Label | Prediction |
|---|---|---|
| Cineplex Cinemas<br>4340 Carl Circle<br>Grantborough,<br>81420<br>+61(4)1907000052<br>08/05/2008 21:55:37 | 4340 Carl Circle | 4340 Carl Circle |
| A D E Metro-Midtown Taxi<br>Ltd<br>359 Michael Circle<br>East Bethview, 69174<br>312-218-8805x360<br>19/01/1990 02:32:17AM | Ltd | Ltd |

FIG. 5

| Image | output |
|---|---|
| Executive Cleaners<br>2013/11/05 07:14:58AM<br>307 Walter Walks<br>Katelynberg,<br>95337<br>1-993-030-4492x91640 | {<br>name: Executive cleaners,<br>date: 2013/11/05 07:14:58AM,<br>phone: 1-993-036-4492X91640<br>} |
| 2004/03/13<br>12:50:57<br>Costco Wholesale<br>68243 Danny Mount<br>South Toddview, 09420<br>+35(4)5521783041 | {<br>name: Costco wholesale,<br>date: 2004/03/13 12:50:57,<br>phone: +35(4)5521783041<br>} |

FIG. 6

| Input | Label | Prediction |
|---|---|---|
| Pink Sugar Beauty Studio [receipt] | 29/10/2007 11:41:13PM | 29/10/2007 11:41:13PM |
| Executive Cleaners [receipt] | 2013/11/05 07:14:58AM | 2013/11/05 07:14:58AM |
| International Clothiers [receipt] | 1990/01/23 03:07:43 | 1990/01/23 03:07:43 |
| [receipt] | 1993-08-25 12:07:02AM | 1993-08-25 12:07:02AM |

FIG. 7

| Input | Label | Prediction |
|---|---|---|
| Euphoric cerea £ 3.94<br>Honey nut whol £ 6.18<br>Sumsuma organi £ 2.14<br>Orange & tange £ 7.08 | 7.08 | 7.08 |
| 100% whole whe 8.80 $<br>Roasted garlic 6.81 $<br>1% Strawberry 9.71 $ | 9.71 | 9.71 |
| 1% UHT milk CAD 9.21<br>Weightless hyd CAD 5.52<br>French onion s CAD 8.40 | 9.21 | 9.21 |
| Italian pepper 6.18 $<br>Frozen four ch 1.36 $ | 6.18 | 6.18 |

FIG. 8

| Image | query | prediction |
|---|---|---|
| 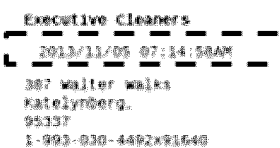 | 0 | 2013/11/05 07:14:58AM |
| 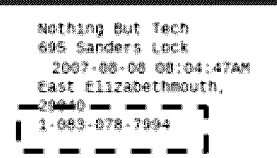 | 1 | 1-083-078-7994 |
|  | 0 | 2004/03/13 12:50:57 |
| 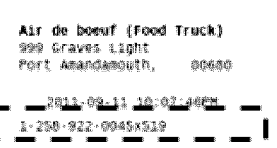 | 1 | 1-258-922-0045x519 |
FIG. 9

AUTOMATICALLY PREDICTING TEXT IN IMAGES

CROSS REFERENCE TO RELATED APPLICATIONS

The present application is a U.S. National Phase Application pursuant to 35 U.S.C. § 371 of International Application No. PCT/CA2019/051627 filed Nov. 14, 2019, which claims priority to U.S. Provisional Patent Application No. 62/767,750 filed Nov. 15, 2018. The entire disclosure contents of these applications are herewith incorporated by reference into the present application.

TECHNICAL FIELD

The present invention relates to extracting text from images. More specifically, the present invention relates to automatically detecting and predicting elements of interest within text objects in images.

BACKGROUND

Optical character recognition (OCR) is today a field of great interest. As is well-known, OCR is a process in which text is digitally encoded based on digital images containing that text. The text may be printed or typed, and in some cases even handwritten. OCR techniques are used in digital data entry, text mining, and many other machine reading applications.

One component of OCR is text detection. That is, before the individual characters in a certain piece of text can be recognized, that piece of text must be identified as being 'text'. In many OCR studies, text detection has been a trivial task: these studies often use low-resolution images with predictably located text. Text detection based on real-world data, however, can be far more complex. Real-world images of text-rich documents may be damaged and/or feature text in unpredictable locations. Additionally, 'natural-scene images' (for instance, images of streets) may contain very little text relative to the overall content of the image. Text detection is, additionally, often more challenging than other forms of object detection within images. For instance, many objects within images have known or predictable size ratios. As a result, partial images of such objects may be used to infer the remainder of those objects, even when that remainder is occluded by other items in the image. Full text objects, on the other hand, cannot be accurately inferred from portions thereof, as the precise content and size of a text object will vary depending on the word or phrase. Thus, real-world text detection presents many challenges for machine vision systems.

Another component of OCR is character recognition. That is, once a text object is detected, the individual characters that form that text object are individually recognized. Character recognition may use simple comparison techniques to identify the individual characters (e.g., comparing an image of a letter to a font database). However, simple comparison may be complicated by 'messy' real-world data, which may contain occlusions, different sorts of noise, new or unknown fonts, and unexpected sizes and orientations of the text object. Thus, many character recognition techniques involve some element of 'prediction' (particularly those using neural networks). This prediction step may additionally speed up the recognition process. For instance, a character recognition technique may recognize the letter 't' in some text object. In the English language, the letter 't' is often followed by the letter 'h'. Thus, the character recognition technique might 'predict' that the letter following the 't' would be an 'h'. The accuracy of that prediction can be used to inform later predictions.

These two components of OCR are often performed separately. That is, two separate systems may be involved, one for detecting text within images and the other system for recognizing characters within cropped image sections that contain the text. However, performing both components of OCR using a single system (what may be called 'end-to-end OCR') can provide many advantages over the two-system method, in terms of speed, complexity, and flexibility.

Other systems for performing similar tasks, unfortunately, also have their own drawbacks. In one specific system, all text found in an image is provided as output. However, users may not always want to extract all the text from an image. Rather, users may wish to see only certain elements of the text (for instance, a name or an address). Additionally, extracting a specific field of interest based on the pattern or content of that field of interest also speeds up the system and reduces the system's vulnerability to noise, since the model will output a short meaningful text instead of a very long sequence of characters. This reduced vulnerability to noise would be especially important in extracting specific fields from forms and documents. Thus, there is a need for methods and systems of OCR that can be 'guided' to identify only certain elements of a text.

SUMMARY

The present invention provides systems and methods for detecting and predicting text within images. An image is passed to a feature-extraction module. Each image typically contains at least one text object. Each text object contains at least one character. Based on the image, the feature-extraction module generates at least one feature map indicating text object(s) in the image. A decoder module then receives the feature map(s). In some implementations, the decoder module applies a weighted mask to the feature map(s). Based on the feature map(s), the decoder module predicts a sequence of characters in the text object(s). In some embodiments, that prediction is based on previous known data. The decoder module is directed by a query that indicates at least one desired characteristic of the text object(s). An output module then refines the predicted content. At least one neural network may be used.

In a first aspect, the present invention provides a method for detecting at least one text object within an image and for predicting content of said at least one text object, the method comprising the steps of:
(a) receiving said image;
(b) passing said image through a feature-extraction module to thereby produce at least one feature map corresponding to said image, wherein contents of said at least one feature map indicate features detected in said image, and wherein at least one of said features is said at least one text object;
(c) passing said at least one feature map through a decoder module to thereby predict said content, wherein said content comprises at least one character; and
(d) based on previous results from said decoder module, refining said predicted content;
wherein said decoder module receives a query from said user;
and wherein said query identifies at least one desired characteristic of at least one said desired text object;

and wherein said query directs said decoder module to predict characters comprising at least one said desired text object.

In a second aspect, the present invention provides a system for detecting at least one text object within an image and for predicting content of said at least one text object, the system comprising:
- a feature-extraction module for receiving said image and for producing at least one feature map corresponding to said image, wherein contents of said at least one feature map indicate features detected in said image, and wherein at least one of said features is said at least one text object;
- a decoder module for processing said at least one feature map, to thereby predict said content, wherein said content comprises at least one character; and
- an output module for refining said content predicted by said decoder module;

wherein said decoder module receives a query from said user;
and wherein said query identifies at least one desired characteristic of at least one desired text object;
and wherein said query directs said decoder module to predict characters comprising said at least one desired text object.

In a third aspect, the present invention provides non-transitory computer-readable media having encoded thereon computer-readable and computer-executable instructions that, when executed, implement a method for detecting at least one text object within an image and for predicting content of said at least one text object, the method comprising the steps of:
(a) receiving said image;
(b) passing said image through a feature-extraction module to thereby produce at least one feature map corresponding to said image, wherein contents of said at least one feature map indicate features detected in said image, and wherein at least one of said features is said at least one text object;
(c) passing said at least one feature map through a decoder module to thereby predict said content, wherein said content comprises at least one character; and
(d) based on previous results from said decoder module, refining said predicted content;

wherein said decoder module receives a query from said user;
and wherein said query identifies at least one desired characteristic of said at least one desired text object;
and wherein said query directs said decoder module to predict characters comprising said at least one desired text object.

BRIEF DESCRIPTION OF THE DRAWINGS

The present invention will now be described by reference to the following figures, in which identical reference numerals refer to identical elements and in which:

FIG. 5 shows additional results from a test system configured according to an aspect of the invention;

FIG. 6 shows further results from a test system configured according to an aspect of the invention;

FIG. 7 shows still further results from a test system configured according to an aspect of the invention;

FIG. 8 shows still further results from a test system configured according to an aspect of the invention;

FIG. 9 shows still further results from a test system configured according to an aspect of the invention;

DETAILED DESCRIPTION

Figures 1, 2:
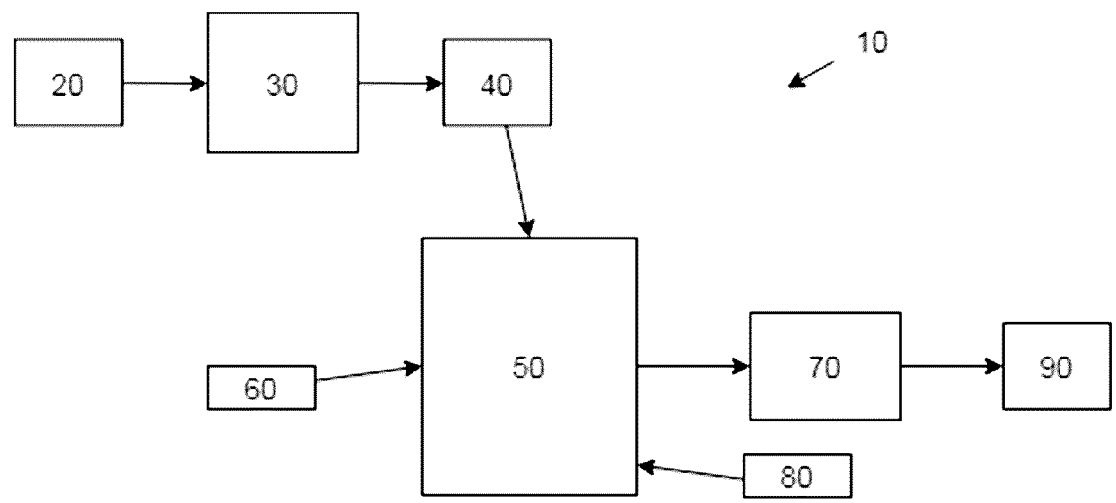
FIG. 1 is a block diagram of a system according to one aspect of the invention.
FIG. 2 shows orientation-independent results of a test system configured according to an aspect of the invention.

The present invention provides systems and methods for automatically extracting text from digital images. Referring to FIG. 1, a block diagram illustrates a system 10 according to one aspect of the invention. In the system 10, an image 20 is passed as input to a feature-extraction module 30. The image 20 typically contains at least one text object but is not required to contain any text objects. Each text object contains at least one character. The feature-extraction module 30 generates at least one feature map 40 based on the image 20. That feature map 40 is then passed as input to a decoder module 50, which predicts content of said at least one text object (i.e., at least one character comprising each text object). The decoder module 50 is directed by a query 60 that indicates at least one desired characteristic of the text object(s) of interest. In some embodiments, the decoder module 50 accounts for external data 80 when making predictions. The output of the decoder module 50 is then passed to an output module 70, which refines the predicted content. The output module 70 then outputs the refined predicted content 90.

The at least one feature maps 40 represents features of the image 20, including text features. In some implementations, the feature-extraction module 30 processes the image 20 using multiple different filters (which may also be referred to as 'convolution kernels'). In such implementations, each feature map produced may correspond to a different one of those filters, as each filter may be configured to extract a different type of feature from the image 20. Note that there will typically be many feature maps 40 produced. For instance, some implementations may produce hundreds or thousands of feature maps 40. In some implementations, the number of feature maps may be set by a user of the system. In implementations using machine learning elements, as will be discussed in more detail below, the number of feature maps 40 may be an initial parameter for those machine learning elements.

In some implementations, the feature map 40 generated is a numerical array wherein each array value corresponds to at least one pixel of the image 20. In such implementations, the array values in the feature map 40 may be float values between 0 and 1 that correspond to features depicted by the corresponding pixel(s) in the image 20. In such cases, higher array values may correspond to pixels that are more likely to depict text. That is, if one pixel in the image 20 depicts part of a text object, a corresponding array value in a feature map 40 would be closer to 1 than to 0. On the other hand, if that pixel in the image 20 depicts something other than a text object (i.e., a "not text" feature), the corresponding array value in the feature map 40 would be closer to 0 than to 1. In other implementations, the array values in the feature map 40 may be binary values (i.e., either 0 or 1), or 'binarized' float values: that is, float values determined as described but rounded to the nearer integer. Additionally, the correspondence between the array values and the image pixels may be configured in any way. As an example, numbers other than 0 and 1 could be used as the boundary values. As another example, the lower end of a value range (e.g., the '0' end) could represent text, while the upper end of the value range (the '1' end) could represent "not text". The feature map(s) 40 are then passed to the decoder module 50.

In a preferred embodiment of the invention, moreover, the decoder module 50 also receives an encoded version of a coordinate system corresponding to the feature map(s) 40. This coordinate system is preferably encoded using a 'one-hot' encoding system, which is well-known in the art. This associates specific coordinates with the feature map(s) and allows the feature map(s) to carry information about specific pixel coordinates to the decoder module 50. The character-recognition module 50 can then perform 'pixel-wise' operations on the feature maps (that is, pixel-by-pixel operations), without losing coordinate information. Such pixel-wise implementations are generally preferred.

Among other considerations, pixel-wise implementations make the present invention orientation-independent. That is, because each pixel in the image and each value in the feature map is treated separately, the present invention can simultaneously recognize text that is vertical, horizontal, or at any other angle to the axes of the image 20. This is shown in FIG. 2: an image containing the word "Lifeguards" was fed into the system 10 in both a vertical orientation and a horizontal orientation. The expected result from each—that is, the known content, the word "Lifeguards"—is shown in the 'label' column. The result predicted by the system 10 is shown in the column labeled 'prediction'. As can be seen, the system 10 accurately predicted the correct word in both instances, orientation notwithstanding.

The decoder module 50 uses the feature map(s) as a 'guide' or a 'map' that indicates where text features may be found in the image, and thus indicating regions on which the decoder module 50 should 'focus'. As would be understood, such a guide or map may be useful in many OCR contexts, as it would be inefficient to attempt to recognize text characters in features that do not contain text. Guided by such a map, the character-recognition module 50 can look for characters where they are likely to be found.

As mentioned above, the decoder module 50 can be directed by a query 60 that indicates at least one desired characteristic of the text object(s) of interest. Thus, where a query is used, the output of the character-recognition module 50 is not required to include all the text in the image 20. As an example, the query 60 may direct the character-recognition module 50 to return text corresponding to a specific location in the image 20. For instance, if the image 20 is an image of an English-language business letter, the query 60 may direct the character-recognition module 50 to only predict content in the upper left—the typical location of the recipient's address. In the same example, the query 60 may direct the decoder module 50 to directly predict fields such as the recipient's address, based on the content of those fields, regardless of where those fields are located in the image 20—i.e. the query 60 directs the character-recognition module 50 to predict content of a desired type, rather than content in a desired location. As another example, the decoder module 50 can be trained to extract "date and time", "phone number", or "email fields" from the images, regardless of where in the image these fields are located.

Of course, some images may not contain certain fields—for instance, a query 60 may direct the decoder module 50 to extract a "date and time" from an image 20, whether or not the image 20 contains a "date and time". In this case, the decoder module 50 can output a value to indicate that no content corresponding to the desired field was found in that image 20. Such a value may include an empty string, a "NOT FOUND" text object or similar, or any other indicator.

Additionally, the query 60 may direct the decoder module 50 to recognize the field of interest based on the surrounding context of some piece of content: for instance, the query 60 may direct the decoder module 50 to predict content from only the second line of a multi-line text. As another example, the query 60 may direct the decoder module 50 to recognize every instance of the word "total" in the image 20. As a further example, the decoder module 50 can be directed to extract the maximum number found in an image.

Moreover, in some implementations, the query 60 may be configured to correspond to an input from a user. In such an implementation, the desired content may change depending on the image. Additionally, in some implementations, the desired characteristics may be an index or identification number associated with the text objects. As would be understood by the person skilled in the art, many other queries and desired characteristics are possible. The decoder module 50 may also receive external data 80 on which to base its predictions. The external data 80 may comprise accurate labels for the image(s) 20 and/or other prior knowledge.

Once the decoder module 50 has predicted the content of the text object(s), the output module 70 refines that content. In some implementations, this refining process is rules-based and the rules are built in to the output module 70. In other implementations, the output module 70 may comprise a machine-learning module, such as a neural network, for refining the content. Results from that machine-learning module may then be adjusted based on predetermined rules and presented as output.

In some cases, the user may not wish to specify a desired kind of text object or any characteristic of the desired text object. In such cases, the 'query' may be a default query that is configured to return all the text contained in the input image. (Of course, other default query settings may be implemented, depending on the user's preference. For instance, another 'default query response' may be to return the first text object identified in the image.) Additionally, as should be understood, there may be cases in which the input image 20 comprises no text objects (for instance, a natural scene image showing no text information). In such a case, the system could return an empty string, or a "NO TEXT FOUND" statement, or any similar indicator.

For a better understanding of the present invention, the reader is directed to Wojna et al., "Attention-based Extraction of Structured Information from Street View Imagery", arXiv:1704.03549 [cs.CV], 2017, the entirety of which is herein incorporated by reference.

Figures 3, 4:
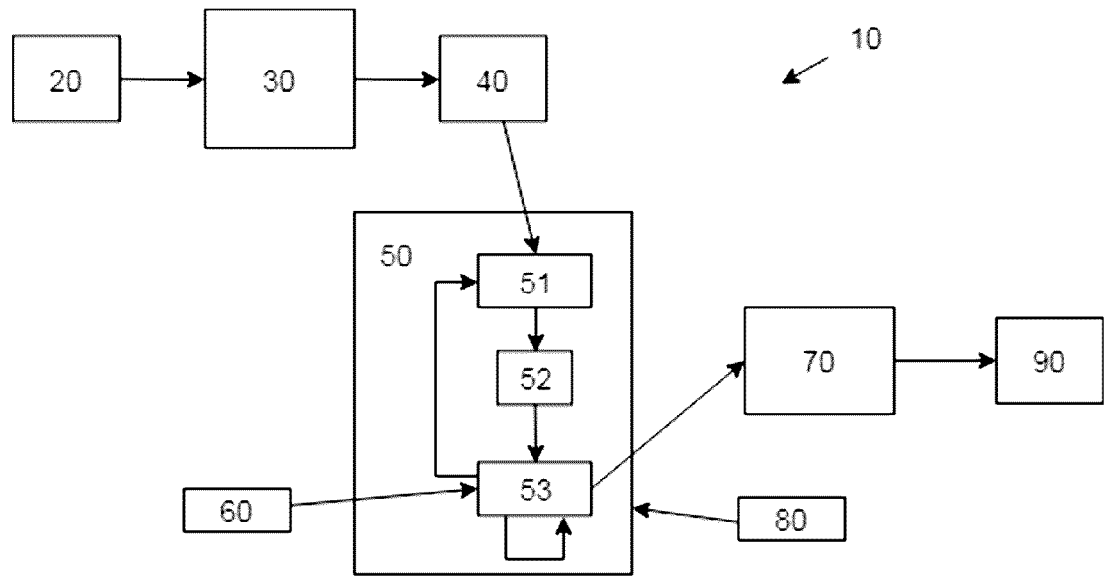
FIG. 3 is a block diagram showing another embodiment of the system in FIG. 1.
FIG. 4 shows results from a test system configured according to an aspect of the invention.

Referring now to FIG. 3, a block diagram shows a variant of the system in FIG. 1. This system 10 is very similar to that in FIG. 1: an image 20 is passed to the feature-extraction module 30, which produces at least one feature map 40. The feature map(s) are then passed to the character-recognition module 50. However, in this embodiment of the system 10, the decoder module 50 is subdivided into other modules, a masking module 51 and a character-recognition module 53.

The masking module 51 receives the feature map(s) 40 from the feature-extraction module 30. The masking module 51 then produces a feature mask for each of the feature maps 40, so that each feature mask corresponds to a single character in the image 20. The masking module 51 then applies the masks to the feature map(s) 40 to thereby generate a set of weighted features 52. That set of weighted features 52 is then fed to the character-recognition module 53. This set of weighted features 52 is used to further refine the map and direct the 'attention' of the character-recognition module 53. Higher weights in this set of weighted features 52 may indicate a higher likelihood of a text character in one region of the feature map 40. The weighted features 52 are thus passed to the character-recognition module 53, which recognizes the content of text objects using the weighted features 52 and the query 60. As in FIG. 1, that recognized content is then sent to the output module 70 for further refining.

As would be clear to the person of skill in the art, each of the modules comprising the present invention may be rules-based modules. However, it is preferred that the feature-extraction module 30 and the decoder module 50 each comprise at least one trained neural network. As is well-known, neural networks are well-suited to feature extraction and character recognition tasks. Further, the decoder module 50 may comprise two separate neural networks, one corresponding to the masking module 51 and the other corresponding to the character-recognition module 53. One possible implementation of such a system uses an attention mechanism as the basis for its masking module 51 and a long short-term memory unit (LSTM) as its character-recognition module 53. Attention mechanisms and LSTMs are well-known in the art. However, note that other neural network architectures may be used: for instance, the character-recognition module 53 may be any kind of recurrent neural network, or any other architecture that performs a similar function. Similarly, the feature-extraction module 30 may comprise a convolutional neural network or may use any other suitable architecture. Additionally, as would be clear to the person skilled in the art, the feature-extraction module 30 and the decoder module 50 may comprise both rules-based elements and neural-network-based elements.

In implementations that use neural-network modules, the query 60 may be introduced at training time as a mapping between different fields (based on content, context, location, or other characteristics, as outlined above). Typically, as would be understood by the person skilled in the art, the model would be trained using multiple different queries and field values corresponding to those queries. Each query is encoded into a vector and is concatenated to the input of the character-recognition module 53 at each step. Therefore, the decoder would 'learn' different mappings between query values and their corresponding fields. Note that, in a neural-network-based implementation, external data 80, such as accurate labels for the images 20, may be used in the network training process.

Additionally, as would be understood, there may be cases in which more than one value corresponding to a certain field may be present in an image 20. For instance, an image 20 may contain many "date and time" fields. In this case, a query 60 could direct the decoder module 50 to return any or all of the content of the "date and time" fields in this image. For example, the query 60 could direct the decoder module 50 to return the first "date and time" found in the image. As another example, the query 60 could direct the decoder module 50 to return the earliest "date and time" found (i.e., the date and time corresponding to the earliest calendar "date and time"). As a further alternative, the query 60 could direct the decoder module 50 to request direction from a user in such cases.

EXAMPLES

Multiple tests of the present invention have been performed. In the system used in testing, a trained convolutional neural network was used as the feature-extraction module 30, and a neural network architecture comprising both attention layers and LSTM layers was used as the character-recognition module 50. The testing model was trained on two synthetic data sets, including a synthetic receipts dataset. Additionally, for some tasks, the testing model was trained on the well-known COCO data set, as well as on a dataset of real-world shipping forms. The testing model achieved 81% accuracy when given a new, unseen dataset. Various tests were performed to examine the effect of different queries.

Example 1: First Two Lines

In this test, the query 60 was configured to direct the decoder module 50 to predict only the first two lines of each text object in the image. The inputs, correct answers, and model results are shown in FIG. 4. As can be seen, the model returned accurate results (in the 'Prediction' column) in both cases shown, image quality and differences in text format (i.e., bold text vs. non-bold text) notwithstanding. The remaining text in each text object was ignored. In the overall test, the model achieved 96.5% accuracy.

Example 2: Second Line

As can be seen in FIG. 5, the query in the second test was configured to direct the decoder module 50 to predict only the second line of the text object in the image. Again, from the 'Predictions' column, it can be seen that the model returned the second line only, as intended. Overall, the model had a 98.8% accuracy rating in this test.

Example 3: Date and Time

In the next test performed, the query was configured to direct the decoder module 50 to identify and predict a date and time in each image. As shown in FIG. 6, again, the model results agreed with the expected results. As discussed above, if the desired field is not found in the image, the model may output an empty string or any other kind of "not found" variable.

Example 4: Maximum Number

This test used a context-based query. That is, in this test, the model was trained to determine the maximum number in each image. As can be seen from FIG. 7, there are several numbers in each image, but the model successfully returned the largest number from each. The overall accuracy rate for this test was 96.1%.

Example 5: User Input

In this test, the query was configured based on an input value received from a user. In the case shown in FIG. 8, if the user input was 0, the query would direct the decoder module 50 to detect and return a date in the image. If the user input was 1, the model would be directed to return a phone number found in the image. Note of course that the '0' and '1' input values were merely chosen for convenience. The present invention does not require binary input values. Further, some implementations may have more than two options. The overall accuracy value for this test was 97.3%.

Example 6: Multi-Field Returns

Another test performed examined multi-field returns: that is, a single query was simultaneously directed to multiple types of content. Sample input images and their corresponding results are shown in FIG. 9. As can be seen, this model returned the expected multi-field values in each case. The overall accuracy value for this test was 94.9%. In another test, the model was trained to simultaneously extract all of the six fields in a receipt using a synthetic receipt dataset, and to output a corresponding dictionary (that is, to output all the terms found in those fields). This model had an exact match accuracy of 95%.

Figure 10:
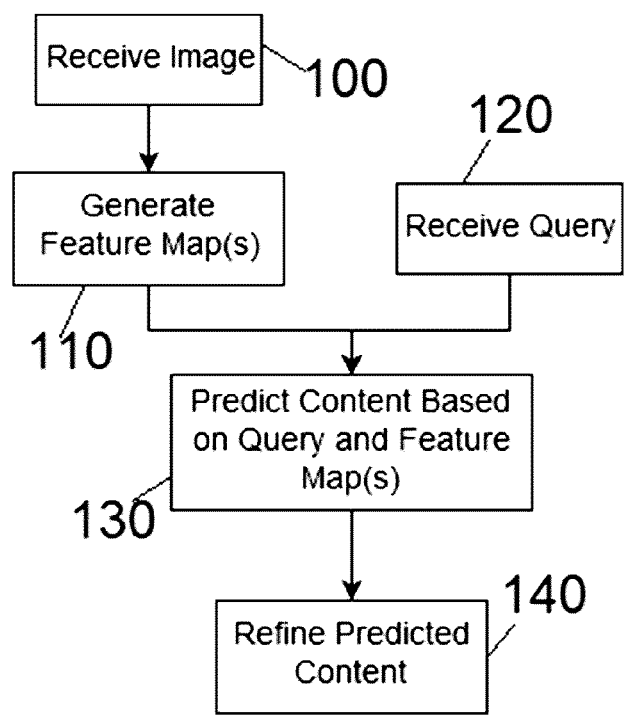
FIG. 10 is a flowchart detailing a method according to one aspect of the invention.

Referring now to FIG. 10, a flowchart detailing a method according to one aspect of the invention is shown. At step 100, an image is received. Then, at step 110, at least one feature map is generated based on that image. A query is received at step 120. As described above, the query may be built in or trained into the system, or the query may depend on user input. Once the query is received, content of text objects in the image is predicted based on the query and the feature map(s) (step 130). As discussed above, that prediction process may use already known, external data. Next, at step 140, that prediction is refined.

Figure 11:
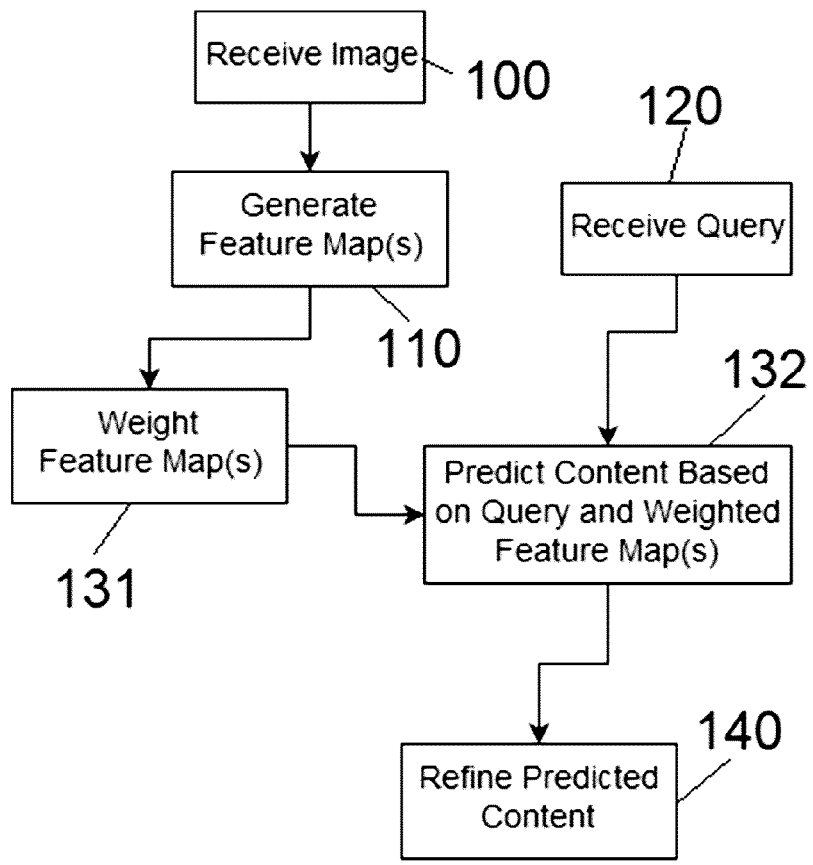
FIG. 11 is a flowchart detailing a variant of the method illustrated in FIG. 10.

FIG. 11 shows another embodiment of the method in FIG. 10. This embodiment is very similar to the method in FIG. 10. An image is received at step 100; at least one feature map is generated at step 110; and a query is received at step 120. However, in this embodiment, the prediction step is subdivided. First, a weighted feature map is generated for each feature map produced at step 110, such that each feature map corresponds to a single weighted feature map and each weighted feature map corresponds to a single feature map (step 131). Then, using the weighted feature map(s) and the query from step 120, the content of text objects in the image is predicted at step 132. That predicted content is then refined (step 140), as in FIG. 10.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for detecting at least one text object within an image and for predicting content of said at least one text object, the method comprising the steps of:
   (a) receiving said image;
   (b) passing said image through a feature-extraction module to thereby produce at least one feature map corresponding to said image, wherein contents of said at least one feature map indicate features detected in said image, and wherein at least one of said features is said at least one text object;
   (c) passing said at least one feature map through a decoder module to thereby predict said content, wherein said content comprises at least one character; and
   (d) based on previous results from said decoder module, refining said predicted content;
   wherein said decoder module receives a query from a user;
   wherein said query identifies at least one desired characteristic of at least one desired text object;
   wherein said query directs said decoder module to predict characters comprising said at least one desired text object;
   wherein said decoder module comprises:
      a masking module for producing at least one weighted feature map, wherein each said at least one weighted feature map is based on a corresponding feature map, and wherein, for each region in said corresponding feature map, a corresponding region in said at least one weighted feature map indicates a probability that said region corresponds to a text object in said image; and a character-recognition module for predicting said content, wherein said character-recognition module uses said at least one weighted feature map to determine regions containing said content;

wherein said character-recognition module is directed by said query; and wherein an output value from said character-recognition module is fed back to said masking module and to said character-recognition module.

2. The method of claim 1, wherein said at least one desired characteristic includes at least one of: a desired location of said at least one text object; a desired type of said content; a desired context of said content; a number corresponding to said at least one text object; and a characteristic corresponding to a user input.

3. The method of claim 1, wherein predicting said content in step (c) is further based on external known data.

4. The method of claim 1, wherein said decoder module further receives pixel coordinates of said image, and said pixel coordinates are used in predicting said content.

5. The method of claim 1, wherein said feature-extraction module comprises a neural network.

6. The method of claim 1, wherein said decoder module comprises at least one neural network.

7. A system for detecting at least one text object within an image and for predicting content of said at least one text object, the system comprising:

a feature-extraction module for receiving said image and for producing at least one feature map corresponding to said image, wherein contents of said at least one feature map indicate features detected in said image, and wherein at least one of said features is said at least one text object;

a decoder module for processing said at least one feature map, to thereby predict said content, wherein said content comprises at least one character; and an output module for refining said content predicted by said decoder module;

wherein said decoder module receives a query from a user;

wherein said query identifies at least one desired characteristic of at least one desired text object;

wherein said query directs said decoder module to predict characters comprising said at least one desired text object;

wherein said decoder module comprises:

a masking module for producing at least one weighted feature map, wherein each said at least one weighted feature map is based on a corresponding feature map, and wherein, for each region in said corresponding feature map, a corresponding region in said at least one weighted feature map indicates a probability that said region corresponds to a text object in said image; and a character-recognition module for predicting said content, wherein said character-recognition module uses said at least one weighted feature map to determine regions containing said content;

wherein said character-recognition module is directed by said query; and wherein an output value from said character-recognition module is fed back to said masking module and to said character-recognition module.

8. The system of claim 7, wherein said at least one desired characteristic includes at least one of: a desired location of said at least one text object; a desired type of said content; a desired context of said content; a number corresponding to said at least one text object; and a characteristic corresponding to a user input.

9. The system of claim 7, wherein said decoder module uses external known data when predicting said content.

10. The system of claim 7, wherein said decoder module further receives pixel coordinates of said image, and said pixel coordinates are used in predicting said content.

11. The system of claim 7, wherein said feature-extraction module comprises a neural network.

12. The system of claim 7, wherein said decoder module comprises at least one neural network.

13. Non-transitory computer-readable media having encoded thereon computer-readable and computer-executable instructions that, when executed, implement a method for detecting at least one text object within an image and for predicting content of said at least one text object, the method comprising the steps of:

(a) receiving said image;

(b) passing said image through a feature-extraction module to thereby produce at least one feature map corresponding to said image, wherein contents of said at least one feature map indicate features detected in said image, and wherein at least one of said features is said at least one text object;

(c) passing said at least one feature map through a decoder module to thereby predict said content, wherein said content comprises at least one character; and (d) based on previous results from said decoder module, refining said predicted content, wherein said decoder module receives a query from a user, wherein said query identifies at least one desired characteristic of at least one desired text object, wherein said query directs said decoder module to predict characters comprising said at least one desired text object;

wherein said decoder module comprises:

a masking module for producing at least one weighted feature map, wherein each said at least one weighted feature map is based on a corresponding feature map, and wherein, for each region in said corresponding feature map, a corresponding region in said at least one weighted feature map indicates a probability that said region corresponds to a text object in said image; and a character-recognition module for predicting said content, wherein said character-recognition module uses said at least one weighted feature map to determine regions containing said content, wherein said character-recognition module is directed by said query, and wherein an output value from said character-recognition module is fed back to said masking module and to said character-recognition module.

14. The non-transitory computer-readable media of claim 13, wherein said at least one desired characteristic includes at least one of: a desired location of said at least one text object; a desired type of said content; a desired context of said content; a number corresponding to said at least one text object; and a characteristic corresponding to a user input.

15. The non-transitory computer-readable media of claim 13, wherein predicting said content in step (c) is further based on external known data.

16. The non-transitory computer-readable media of claim 13, wherein said decoder module further receives pixel coordinates of said image, and said pixel coordinates are used in predicting said content.

17. The non-transitory computer-readable media of claim 13, wherein said feature-extraction module comprises a neural network.

18. The non-transitory computer-readable media of claim 13, wherein said decoder module comprises at least one neural network.

* * * * *